(12) United States Patent
Torazawa

(10) Patent No.: US 12,503,304 B2
(45) Date of Patent: Dec. 23, 2025

(54) TRAVELING VEHICLE SYSTEM

(71) Applicant: MURATA MACHINERY, LTD., Kyoto (JP)

(72) Inventor: Masayoshi Torazawa, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 485 days.

(21) Appl. No.: 18/036,187

(22) PCT Filed: Sep. 27, 2021

(86) PCT No.: PCT/JP2021/035402
§ 371 (c)(1),
(2) Date: May 10, 2023

(87) PCT Pub. No.: WO2022/102265
PCT Pub. Date: May 19, 2022

(65) Prior Publication Data
US 2023/0399171 A1 Dec. 14, 2023

(30) Foreign Application Priority Data
Nov. 13, 2020 (JP) .................... 2020-189775

(51) Int. Cl.
*B65G 1/04* (2006.01)

(52) U.S. Cl.
CPC .... *B65G 1/0457* (2013.01); *B65G 2201/0297* (2013.01)

(58) Field of Classification Search
CPC .......... B65G 1/0457; B65G 2201/0297; B65G 1/0464; B65G 1/04; H01L 21/67715; H01L 21/6773; H01L 21/67733; B61B 13/00
See application file for complete search history.

(56) References Cited

U.S. PATENT DOCUMENTS 5,595,121 A * 1/1997 Elliott .................. A63G 7/00
104/53
11,846,935 B2 * 12/2023 Austrheim .............. B60L 53/30
(Continued)

FOREIGN PATENT DOCUMENTS

WO 2017/150005 A1 9/2017
WO 2020/090253 A1 5/2020

OTHER PUBLICATIONS

Official Communication issued in International Patent Application No. PCT/JP2021/035402, mailed on Nov. 16, 2021.

*Primary Examiner* — Richard M Camby
(74) *Attorney, Agent, or Firm* — Keating & Bennett, LLP

(57) ABSTRACT

A traveling vehicle system may include a traveling vehicle and a track including first tracks, second tracks, and a partial track. The traveling vehicle may include a traveler to travel on an upper side of the track, a main body below the track, and a coupler to couple the traveler and the main body. A gap through which the coupler passes when the traveling vehicle travels may be between the first track and the partial track, and between the second track and the partial track. The traveler may include a direction changer to change a traveling direction of the traveling vehicle by turning wheels respectively around four turning axes perpendicular to respective axles of the wheels. In a plan view, none of sides of a quadrilateral with the turning axes defining vertices thereof is parallel to the first or second track.

5 Claims, 15 Drawing Sheets

(56) References Cited

U.S. PATENT DOCUMENTS

| | | | |
|---|---|---|---|
| 11,952,213 B2* | 4/2024 | Torazawa | H01L 21/67769 |
| 12,059,966 B2* | 8/2024 | Austrheim | B60S 5/06 |
| 2019/0019707 A1 | 1/2019 | Suzuki | |
| 2021/0387654 A1 | 12/2021 | Ogo et al. | |

* cited by examiner

SYS2

SYS2

FIG.14
SYS3
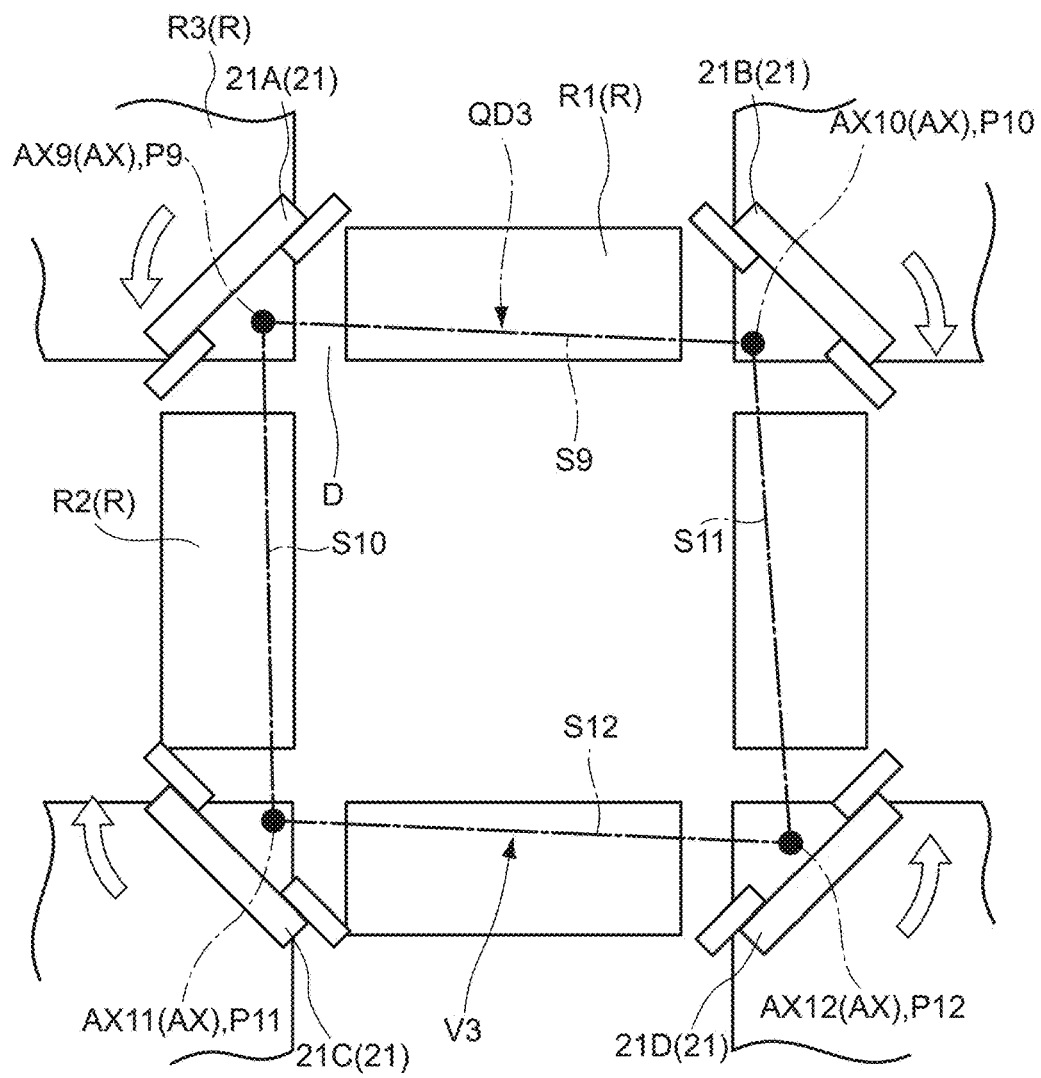
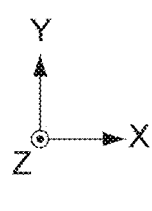
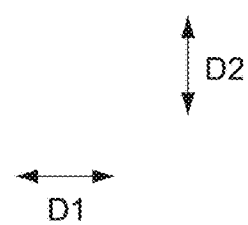

TRAVELING VEHICLE SYSTEM

BACKGROUND OF THE INVENTION

1. Field of the Invention

The present invention relates to a traveling vehicle system.

2. Description of the Related Art

There is known a traveling vehicle system including a grid-patterned track and a traveling vehicle that travels on the track (for example, see International Publication No. WO2017/150005). In the traveling vehicle system disclosed in International Publication No. WO2017/150005, the traveling vehicle includes a traveler that travels on the upper side of the track, a main body that is positioned below the track, and a coupler that couples the traveler and the main body. The track includes a plurality of first tracks provided along a first direction, a plurality of second tracks provided along a second direction perpendicular to the first direction, and a partial track which is provided at a portion where an extension line of the first track and an extension line of the second track intersect. A gap through which the coupler passes when the traveling vehicle travels is formed between the first track and the partial track, and between the second track and the partial track. The traveler can switch the traveling direction of the traveling vehicle between the first direction and the second direction by turning four wheels that travel on the track respectively around the turning axes in the up-down direction.

SUMMARY OF THE INVENTION

In the traveling vehicle system disclosed in International Publication No. WO2017/150005, in the traveler, the wheels on the left and right in the traveling direction are not displaced from each other in the traveling direction, and therefore, when the traveler passes through gaps, the wheels on the left and right pass through the gaps at the same time. When the wheels pass through gaps, vibrations to the traveling vehicle occur simultaneously on the left and right, and the magnitude of the vibrations to the traveling vehicle increases as a result.

Preferred embodiments of the present invention provide traveling vehicle systems each capable of reducing or preventing vibrations to a traveling vehicle.

In an aspect of a preferred embodiment of the present invention, a traveling vehicle system includes a track and a traveling vehicle to travel on the track, wherein the track includes a plurality of first tracks provided along a first direction, a plurality of second tracks provided along a second direction perpendicular to the first direction, and a partial track provided at a portion where an extension line of the first track and an extension line of the second track intersect, the traveling vehicle includes a traveler to travel on an upper side of the track, a main body below the track, and a coupler to couple the traveler and the main body, a gap through which the coupler passes when the traveling vehicle travels is between the first track and the partial track and between the second track and the partial track, the traveler includes four wheels which travel on the track, and a direction changer to change a traveling direction of the traveling vehicle between the first direction and the second direction by turning the four wheels respectively around four turning axes which are perpendicular or substantially perpendicular to respective axles of the wheels, and in a plan view, none of sides of a quadrilateral with the four turning axes defining vertices thereof is parallel to the first track or the second track.

According to a traveling vehicle system of a preferred embodiment of the present invention, the wheels on the left and right in the traveling direction are displaced from each other in the traveling direction. Therefore, the wheels on the left and right enter gaps at different timings regardless of whether the traveling vehicle is traveling on the first track or the second track. The lengths of time required to pass through gaps may partially overlap or may completely be different between the left and right wheels. As a result, it is possible to prevent vibrations and noise generated when the wheels pass through gaps from occurring simultaneously to the left and right wheels, and it is therefore possible to reduce or prevent an increase in noise while realizing smooth traveling by reducing or preventing an increase in vibrations to the traveling vehicle.

The quadrilateral may be a rhombus in a plan view. According to this configuration, the components of the traveler, such as the wheels, are highly symmetric, which makes the production thereof easy and ensures the weight balance in the traveling vehicle.

The four wheels may be provided respectively at positions with equal or substantially equal lengths to the turning axes corresponding thereto. The wheels which correspond to the turning axes corresponding to the vertices of acute angles of the rhombus may be provided on the traveling vehicle's inner side of the turning axes in a plan view. The wheels which correspond to the turning axes corresponding to the vertices of obtuse angles of the rhombus may be provided on the traveling vehicle's outer side of the turning axes in a plan view. According to this configuration, the wheels in the front and rear in the traveling direction are aligned in or substantially in a straight line regardless of whether the traveling vehicle is traveling in the first direction or the second direction, and it is therefore possible to reduce the region on the track through which the traveling wheels pass. Also, according to this configuration, when the four wheels turn respectively around the turning axes, wear occurs uniformly across all of the four wheels.

Two of the wheels which correspond to two of the turning axes at the vertices on first opposing corners of the rhombus may be spaced away respectively from the turning axes corresponding thereto by a first distance. Two of the wheels which correspond to two of the turning axes at the vertices on second opposing corners different from the first opposing corners of the rhombus may be spaced away respectively from the turning axes corresponding thereto by a second distance different from the first distance. The wheels in the front and rear in the traveling direction may be aligned in or substantially in a straight line. According to this configuration, the wheels in the front and rear in the traveling direction are aligned in or substantially in a straight line regardless of whether the traveling vehicle is traveling in the first direction or the second direction, and it is therefore possible to reduce the region on the track through which the traveling wheels pass.

The track may include a grid pattern defined by the first tracks and the second tracks. In a plan view, the main body may be provided so as to fit within one cell in the track having the grid pattern. According to this configuration, when a plurality of traveling vehicles travel on the grid-patterned track, it is possible to prevent the traveling vehicles from interfering with each other even when the traveling vehicles are positioned in adjacent cells.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 14 is a diagram showing an example of an operation in which the traveling vehicle changes the traveling direction thereof from the first direction to the second direction.

DETAILED DESCRIPTION OF THE PREFERRED EMBODIMENTS

Figure 1:
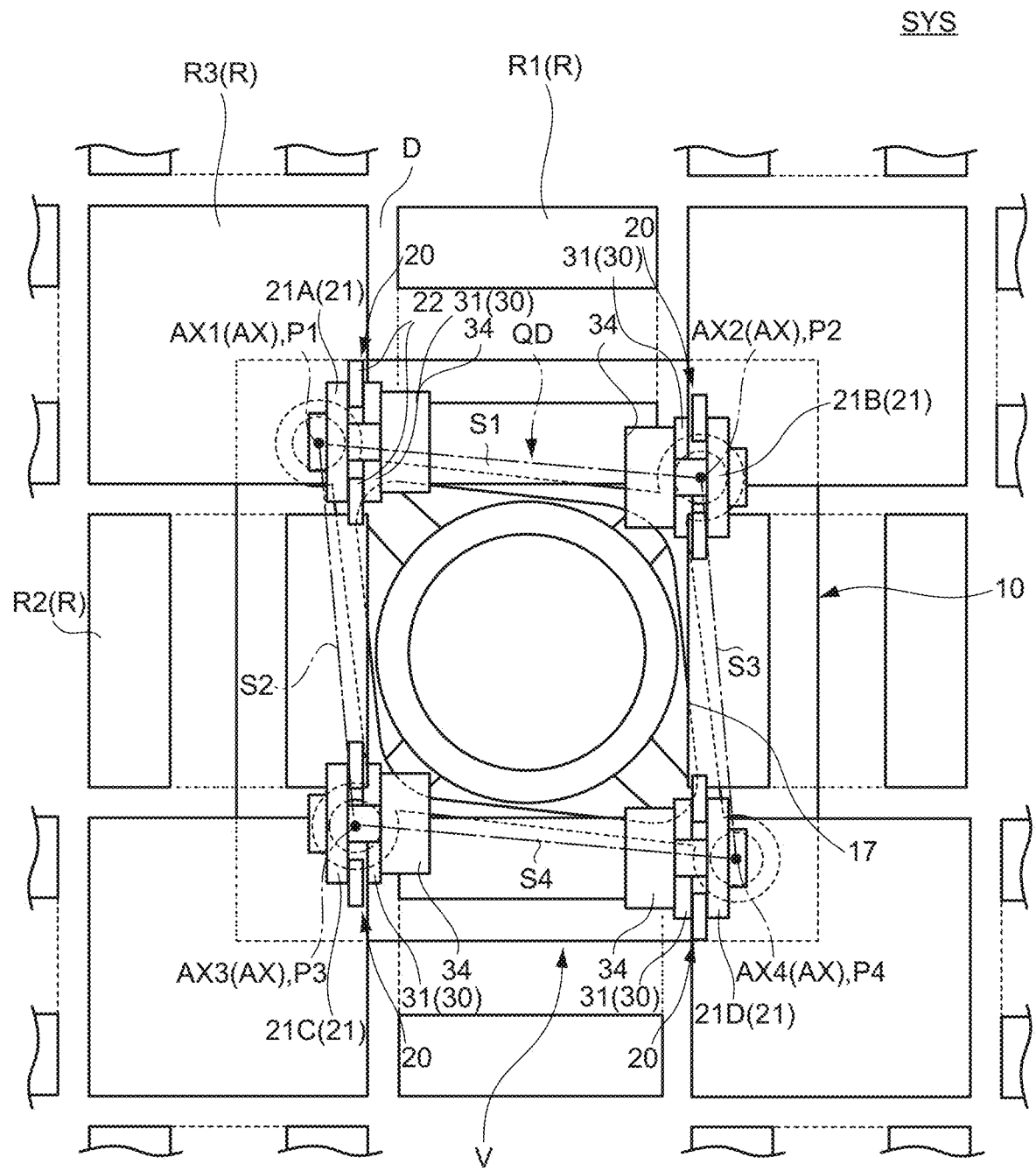
FIG. 1 is a diagram showing an example of a traveling vehicle system according to a first preferred embodiment of the present invention.

Hereinafter, the present invention will be described through preferred embodiments thereof. However, the present invention defined by the claims is not limited to the following preferred embodiments. In the drawings, a scale is changed as necessary to illustrate the preferred embodiments, such as by enlarging or emphasizing a portion, and therefore, the shapes and dimensions in the drawings may differ from those of the actual product. In the following drawings, an XYZ Cartesian coordinate system may be used to describe the directions in each drawing. In the XYZ coordinate system, a plane that is parallel to a horizontal plane is defined as an XY plane. In the preferred embodiments, the X direction is a first direction D1, and the Y direction is a second direction D2. A up-down direction perpendicular to the XY plane is denoted as Z direction. For each of the X direction, the Y direction, and the Z direction, description is made with a definition in which a direction indicated by an arrow is the positive (+) direction and a direction opposite to the direction indicated by the arrow is the negative (−) direction.

Figure 2:
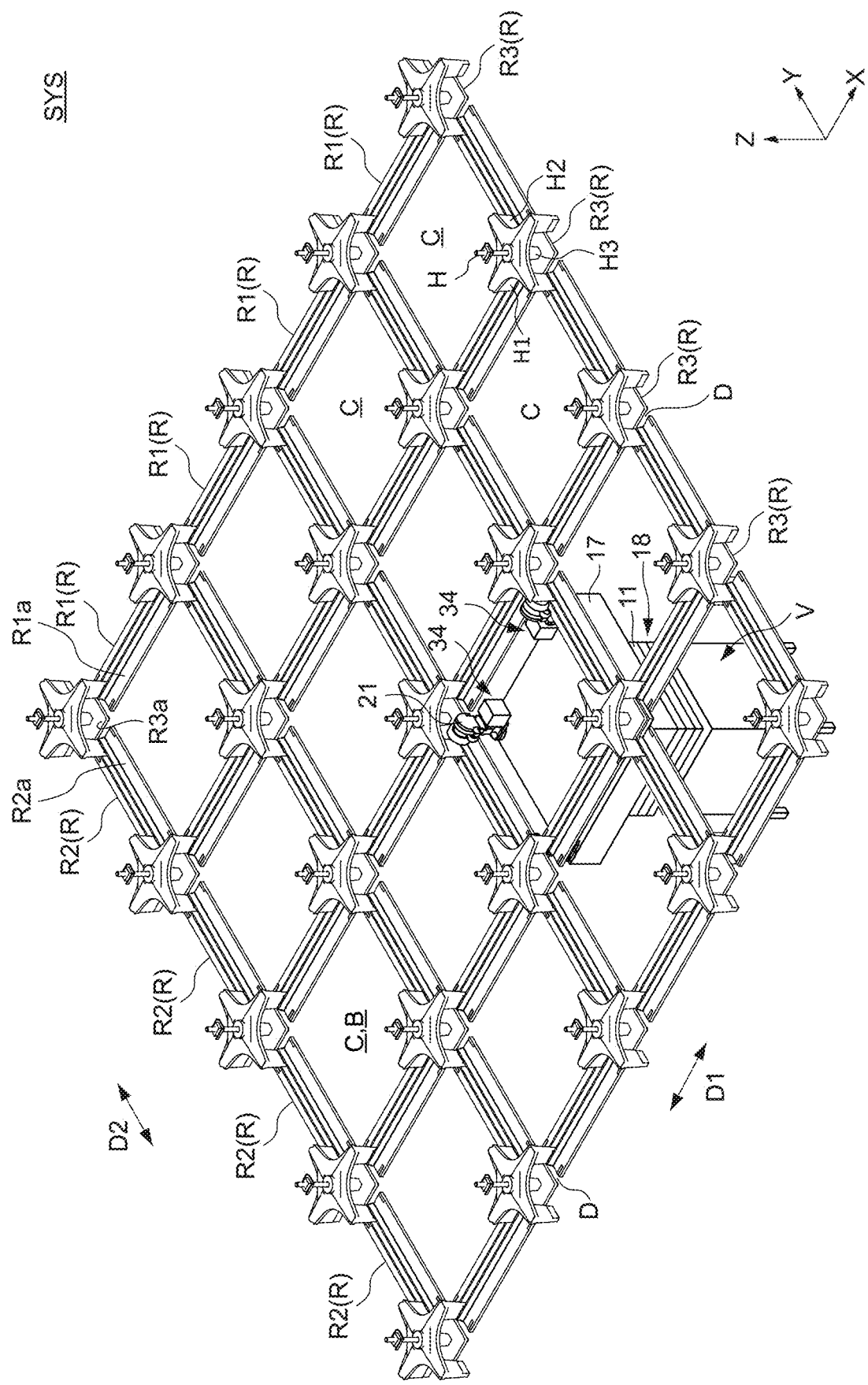
FIG. 2 is a diagram showing an example of the traveling vehicle system according to the first preferred embodiment of the present invention.
Figure 3:
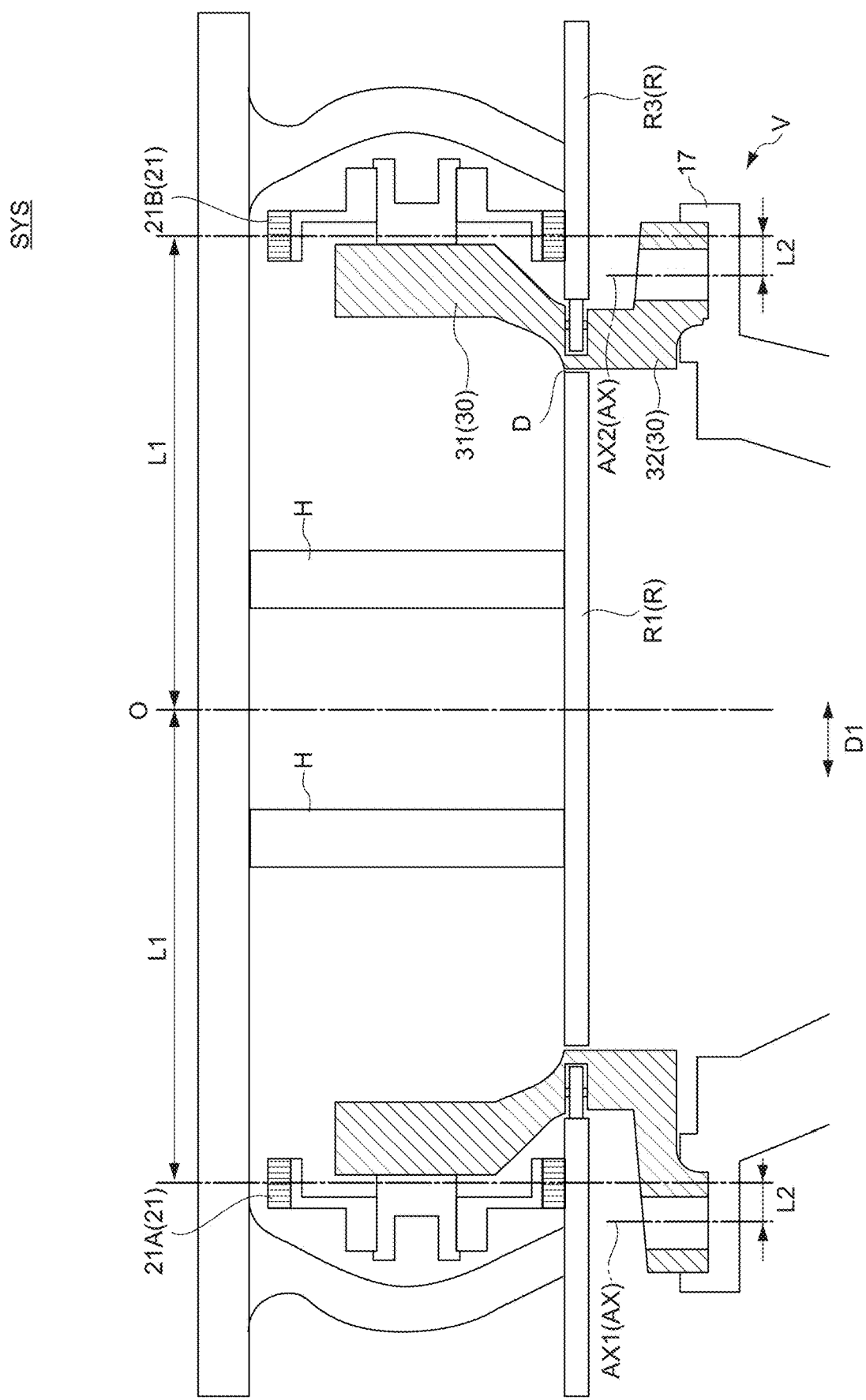
FIG. 3 is a diagram showing an example of a cross section of a traveling vehicle taken along a plane orthogonal to a traveling direction.
Figure 4:
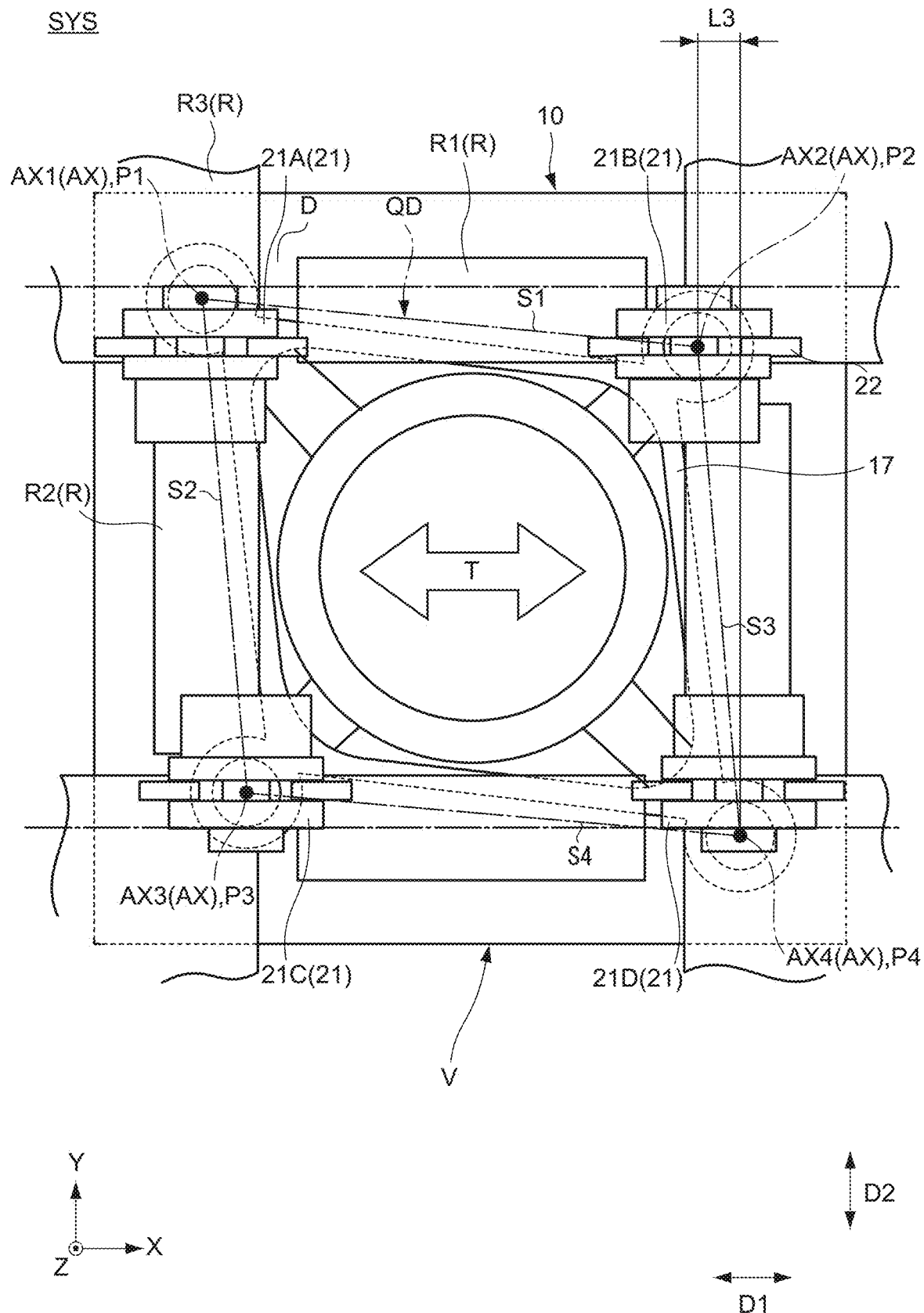
FIG. 4 is a diagram showing an example of an operation in which the traveling vehicle changes the traveling direction thereof from a first direction to a second direction.
Figure 5:
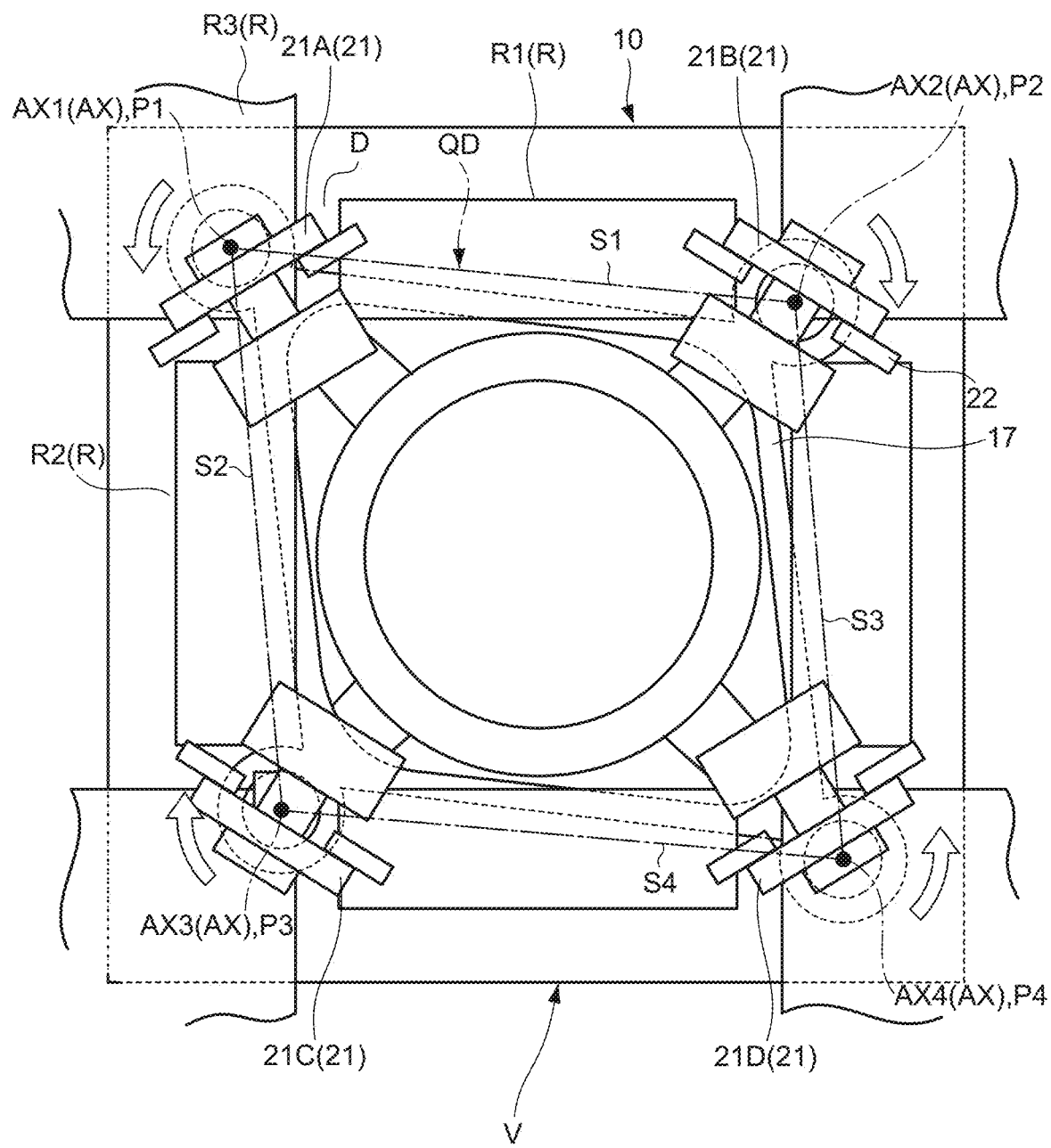
FIG. 5 is a diagram showing an example of the operation in which the traveling vehicle changes the traveling direction thereof from the first direction to the second direction.
Figure 6:
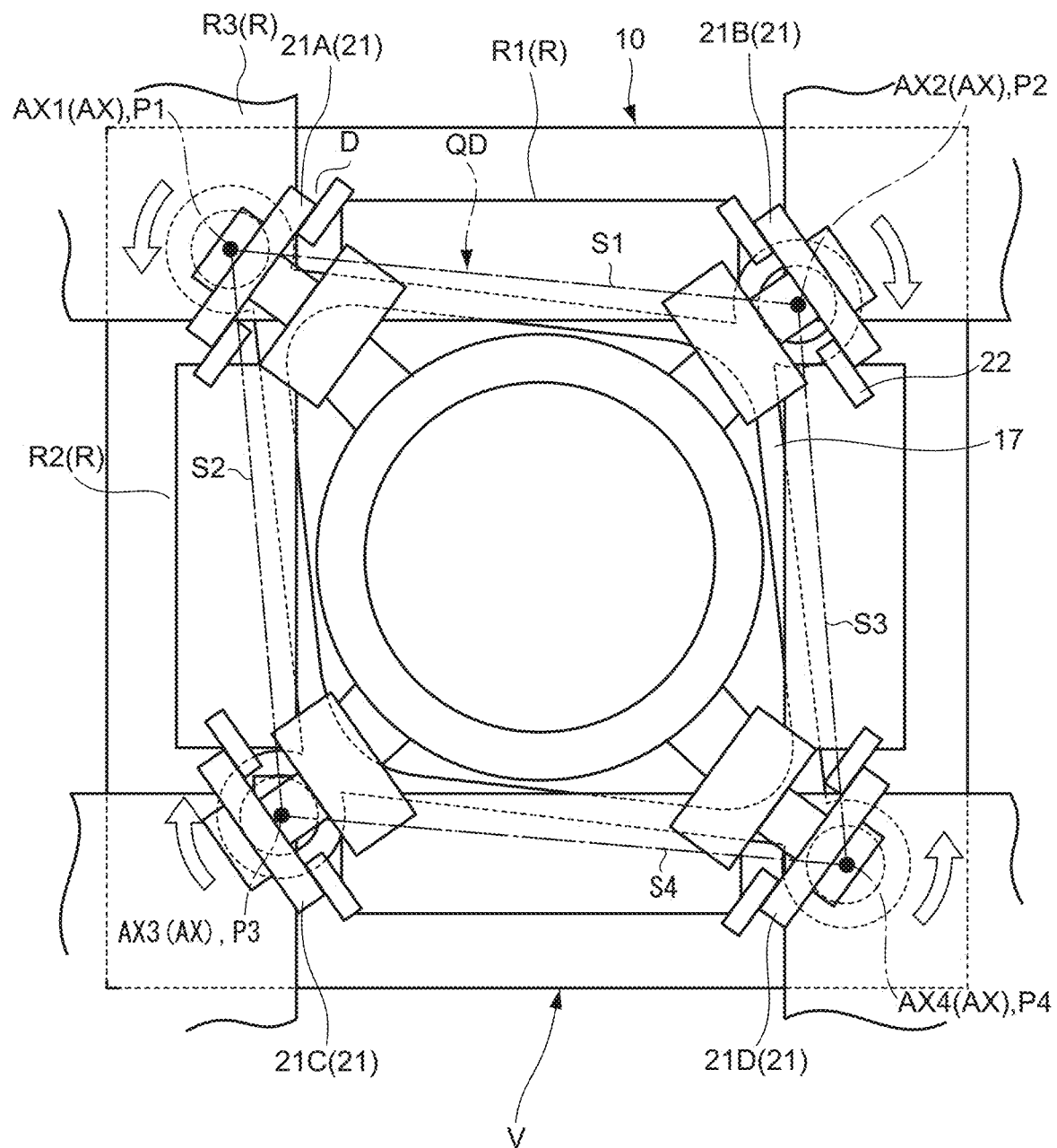
FIG. 6 is a diagram showing an example of the operation in which the traveling vehicle changes the traveling direction thereof from the first direction to the second direction.
Figure 7:
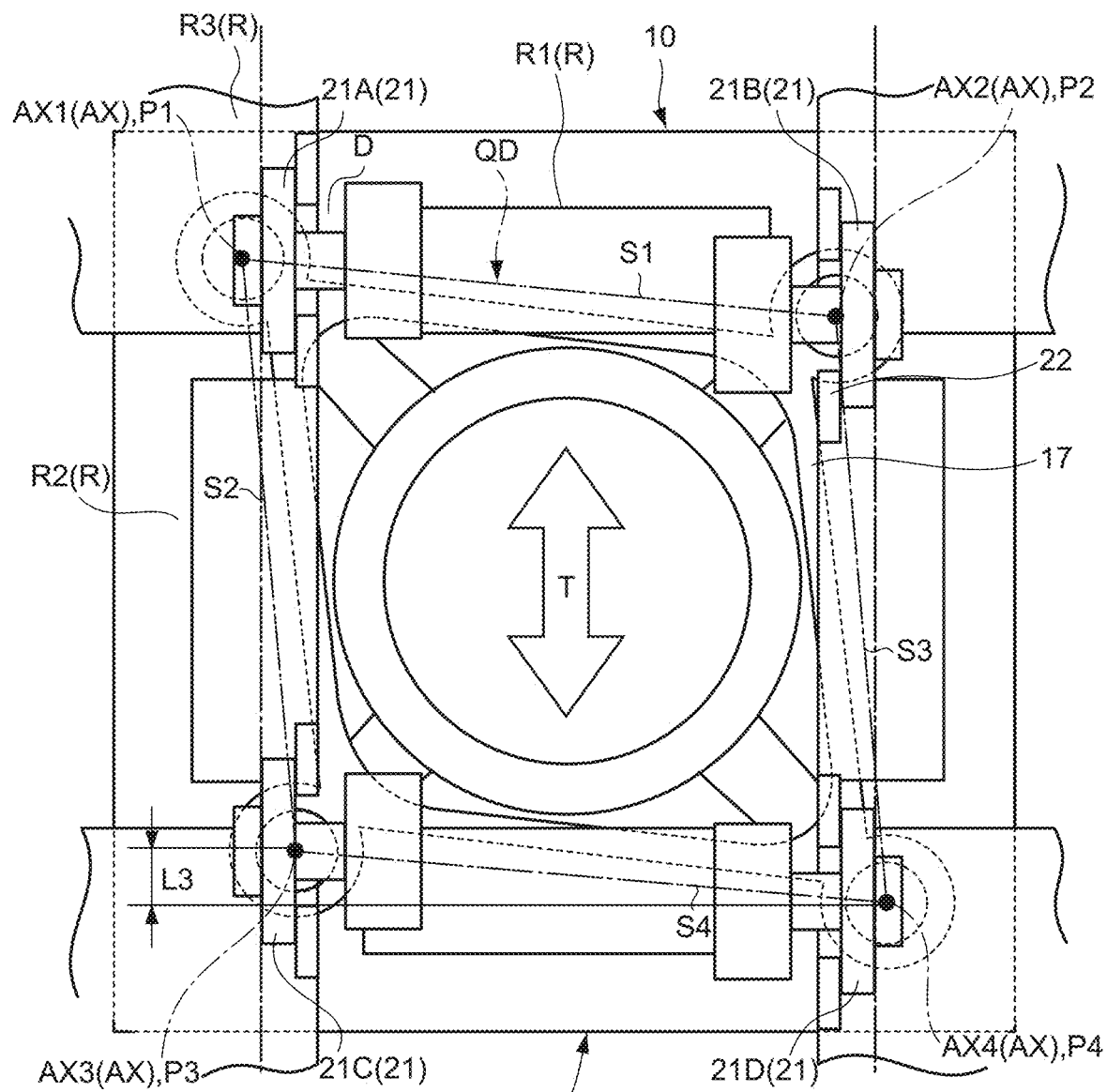
FIG. 7 is a diagram showing an example of the operation in which the traveling vehicle changes the traveling direction thereof from the first direction to the second direction.

FIG. 1 and FIG. 2 are diagrams showing an example of a traveling vehicle system SYS according to a first preferred embodiment. FIG. 3 is a diagram showing an example of a cross section of a traveling vehicle V taken along a plane orthogonal to a traveling direction T. The traveling vehicle system SYS is a system that is installed in a semiconductor device manufacturing factory or the like, and transports articles such as reticle pods accommodating reticles or FOUPs accommodating semiconductor wafers used for manufacturing semiconductor devices. The traveling vehicle system SYS may also be applied to facilities in fields other than semiconductor manufacturing. The articles may also be any other type of articles that can be stored in the traveling vehicle system SYS.

The traveling vehicle system SYS includes a track R and a traveling vehicle V. The track R is a grid-patterned track including first tracks R1, second tracks R2, and partial tracks R3. The first tracks R1 each extend along the first direction D1. The second tracks R2 each extend along the second direction D2. In the present preferred embodiment, the first direction D1 and the second direction D2 are orthogonal to each other, and a plurality of the first tracks R1 and a plurality of the second tracks R2 are provided along directions orthogonal to each other but not intersecting directly with each other. The partial track R3 is arranged at a portion where an extension line of the first track R1 and an extension line of the second track R2 intersect. The partial track R3 is adjacent to the first track R1 in the first direction D1 and is adjacent to the second track R2 in the second direction D2. The partial track R3 connects the first track R1 and the second track R2. In the track R, the first tracks R1 and the second tracks R2 orthogonally intersect with each other, so that a plurality of grid cells C are adjacent to each other as seen in a plan view. One grid cell C is a portion surrounded, as seen in a plan view, by two first tracks R1 adjacent to each other in the second direction D2 and by two second tracks R2 adjacent to each other in the first direction D1, and, in the track R, the same configuration is consecutively formed in the first direction D1 and the second direction D2.

The first tracks R1, the second tracks R2, and the partial tracks R3 are suspended from the ceiling by suspenders H. Each suspender H includes first portions H1 to suspend the first tracks R1, second portions H2 to suspend the second tracks R2, and a third portion H3 to suspend the partial track R3. The first portion H1 and the second portion H2 are each provided at two opposing locations, having the third portion H3 therebetween.

The first track R1 includes a traveling surface R1a on which the traveling vehicle V travels. The second track R2 includes a traveling surface R2a on which the traveling vehicle V travels. The partial track R3 includes a traveling surface R3a on which the traveling vehicle V travels. A gap D is formed between the first track R1 and the partial track R3 and between the second track R2 and the partial track R3. The gap D is a portion through which a coupler 30 serving as a part of the traveling vehicle V passes when the traveling vehicle V having traveled on the first track R1 crosses the second track R2 or when the traveling vehicle V having traveled on the second track R2 crosses the first track R1. Therefore, the gap D is provided with a width that allows the coupler 30 to travel therethrough. The first tracks R1, the second tracks R2, and the partial tracks R3 are provided along the same or substantially the same horizontal plane. In the present preferred embodiment, the first tracks R1, the second tracks R2, and the partial tracks R3 are such that the traveling surfaces R1a, R2a, and R3a thereof are arranged on the same or substantially the same horizontal plane.

The traveling vehicle V includes a main body 10, travelers 20, and couplers 30. The main body 10 is arranged below the track R. The main body 10 preferably has, for example, a rectangular or substantially rectangular shape as seen in a plan view. The main body 10 preferably has a size that fits in a single grid cell C in the track R as seen in a plan view. As a result, a space is ensured for traveling vehicles V traveling respectively on the first track R1 and the second track R2 adjacent to each other to pass one another. The main body 10 includes an upper unit 17 and a transferer 18. The upper unit 17 is suspended from the travelers 20 via the couplers 30. The upper unit 17 is a frame-shaped unit including four corners and an opening in the center portion thereof. The transferer 18 is provided below the upper unit 17. The transferer 18 is turnable around the Z direction.

Each traveler 20 includes a wheel 21 and auxiliary wheels 22. The wheel 21 is arranged at each of four corners of the upper unit 17. Each wheel 21 is mounted on an axle provided in the coupler 30. The axle is provided in parallel or substantially in parallel along the XY plane. Each wheel 21 rolls on the traveling surfaces R1a, R2a, and R3a of the first track R1, the second track R2, and the partial track R3 of the track R, causing the traveling vehicle V to travel.

Each wheel 21 is turnable in the θZ direction around a turning axis AX. The wheel 21 is turned in the θZ direction by a direction changer 34 described later, and as a result, the traveling direction T of the traveling vehicle V can be changed. The auxiliary wheels 22 are each arranged in front and rear of the wheel 21 in the traveling direction T. As with the wheel 21, each auxiliary wheel 22 can rotate around the axis of the axle, which is parallel or substantially parallel along the XY plane. The lower end of the auxiliary wheel 22 is set higher than the lower end of the wheel 21. Therefore, when the wheel 21 is traveling on the traveling surfaces R1a, R2a, and R3a, the auxiliary wheels 22 do not come into contact with the traveling surfaces R1a, R2a, and R3a. When the wheel 21 passes through the gap D, the auxiliary wheels 22 come into contact with the traveling surfaces R1a, R2a, and R3a to prevent the wheel 21 from falling. The configuration is not limited to providing two auxiliary wheels 22 for a single wheel 21, and for example, a single auxiliary wheel 22 may be provided for a single wheel 21, or no auxiliary wheel 22 may be provided.

The coupler 30 couples the upper unit 17 of the main body 10 and the traveler 20. The coupler 30 is provided at each of the four corners of the upper unit 17. The main body 10 is suspended from the traveler 20 by the couplers 30 and is arranged below the track R. The coupler 30 includes a supporter 31 and a connector 32. The supporter 31 rotatably supports the axle of the wheel 21 and the axles of the auxiliary wheels 22. The supporter 31 maintains relative positions between the wheel 21 and the auxiliary wheels 22. The supporter 31 is formed, for example, in a plate shape with a thickness that allows it to pass through the gap D.

The connectors 32 each extend downward from the supporter 31 and is coupled to the upper unit 17 to hold the upper unit 17. Each connector 32 is turnable in the θZ direction around a turning axis AX. The turning of the connector 32 around the turning axis AX can cause the wheel 21 to turn around the turning axis AX in the θZ direction via the supporter 31.

The direction changer 34 is provided in the coupler 30. The direction changer 34 causes the connector 32 of the coupler 30 to turn around the turning axis AX to thereby cause the wheel 21 to turn around the turning axis AX in the θZ direction. It is possible, by turning the wheel 21 in the θZ direction, to switch from a first state in which the traveling direction T of the traveling vehicle V is the first direction D1 to a second state in which the traveling direction T is the second direction D2. It is also possible, by turning the wheel 21 in the θZ direction, to switch from the second state in which the traveling direction T of the traveling vehicle V is the second direction D2 to the first state in which the traveling direction T is the first direction D1.

As a result of the turning of the direction changer 34, the wheel 21 and the auxiliary wheels 22 arranged in each of the four corners of the upper unit 17 all turn in the θZ direction around the turning axis AX within a range of about 90 degrees, for example. The direction changer 34 is driven under the control of an in-vehicle controller. The in-vehicle controller may instruct the four wheels 21 to perform the turning operation at the same timing or may instruct them to perform the turning operation at different timings. By causing the wheel 21 and the auxiliary wheels 22 to turn, the wheel 21 shifts from the state in which the direction of the axle of the wheel 21 is one of the first direction D1 and the second direction D2 to the state in which the direction of the axle of the wheel 21 is the other direction. As a result, it is possible to switch between the first state, in which the traveling direction T of the traveling vehicle V is the first direction D1, and the second state, in which the traveling direction T is the second direction D2.

Here, a quadrilateral QD defined by the four turning axes AX serving as vertices P1 to P4 thereof in a plan view is considered. The quadrilateral QD includes the four vertices P1 to P4 and four sides S1 to S4. The quadrilateral QD is of an arrangement such that none of the sides S1 to S4 are parallel to the first track R1 or the second track R2. In such a configuration, the four wheels 21 are arranged such that two of the wheels 21 on the left and right in the traveling direction T are displaced from each other in the traveling direction T.

In the present preferred embodiment, the quadrilateral QD is a rhombus in a plan view. In such a case, the components of the traveler 20, such as the wheels 21, are highly symmetric, which makes the production thereof easy and ensures the weight balance in the traveling vehicle V.

The wheels 21A, 21D that correspond to the turning axes AX1, AX4 corresponding to the vertices P1, P4 of the acute angles of the rhombus are provided on the traveling vehicle V's inner side of the turning axes AX1, AX4 in a plan view. The wheels 21B, 21C that correspond to the turning axes AX2, AX3 corresponding to the vertices P2, P3 of the obtuse angles of the rhombus are provided on the traveling vehicle V's outer side of the turning axes AX2, AX3 in a plan view. The four wheels 21 may be provided respectively at positions with equal or substantially equal lengths to the turning axes AX corresponding thereto. Since the four wheels 21 all have the same turning radius when turning around the turning axes AX, it is possible to allow wear to occur uniformly across all of the four wheels 21.

In FIG. 3, the wheels 21 corresponding to the vertices P1, P2 are shown as an example. The wheels 21A, 21B in the left-right direction relative to the traveling direction T are both arranged at an equal or substantially equal distance L1 from the center axis O of the traveling vehicle V in a plan view. The length from the turning axis AX1, which corresponds to the vertex P1 of the acute angle of the rhombus, to the wheel 21A and the length from the turning axis AX2, which corresponds to the vertex P2 of the obtuse angle of the rhombus, to the wheel 21B are equal or substantially equal distances L2.

FIG. 4 to FIG. 7 show an example of an operation in which the traveling vehicle V changes the traveling direction T thereof from the first direction D1 to the second direction D2. When the traveling direction T is the first direction D1, that is, when the traveling vehicle V is traveling on the first track R1, the wheel 21A and the wheel 21C are positioned at left and right positions relative to the traveling direction T, and the wheel 21B and the wheel 21D are positioned at left and right positions relative to the traveling direction T. The two wheels 21A, 21C positioned at left and right positions relative to the traveling direction T are arranged in a state of being displaced from each other by a distance L3 in the traveling direction T. The two wheels 21B, 21D positioned at left and right positions relative to the traveling direction T are arranged also in a state of being displaced from each other by the distance L3 in the traveling direction T. Therefore, when the traveling vehicle V is traveling on the first track R1, the left and right wheels 21A, 21C pass through the gaps D at different timings, and the left and right wheels 21B, 21D pass through the gaps D also at different timings. As a result, it is possible to prevent the vibrations and noise generated when the four wheels 21 pass through the gaps D from occurring to the left and right wheels 21 at the same time, and it is therefore possible to suppress an increase in the vibrations to the traveling vehicle V. The four wheels 21 are arranged such that the wheels 21A, 21B in front and rear in the traveling direction T are aligned in or substantially in a straight line. Similarly, the wheels 21C, 21D in front and rear in the traveling direction T are aligned in or substantially in a straight line, and it is therefore possible to reduce the region on the track R through which the wheels 21 pass.

When the traveling direction T is the second direction D2, that is, when the traveling vehicle V is traveling on the second track R2, the wheel 21A and the wheel 21B are positioned at left and right positions relative to the traveling direction T, and the wheel 21C and the wheel 21D are positioned at left and right positions relative to the traveling direction T. The two wheels 21A, 21B positioned at left and right positions relative to the traveling direction T are arranged in a state of being displaced from each other by the distance L3 in the traveling direction T. The two wheels 21C, 21D positioned at left and right positions relative to the traveling direction T are arranged also in a state of being displaced from each other by the distance L3 in the traveling direction T. Therefore, when the traveling vehicle V is traveling on the second track R2, the left and right wheels 21A, 21B pass through the gaps D at different timings, and the left and right wheels 21C, 21D pass through the gaps D also at different timings. As a result, also in the case of traveling on the second track R2, it is possible to prevent the vibrations and noise generated when the four wheels 21 pass through the gaps D from occurring to the left and right wheels 21 at the same time, and it is therefore possible to suppress an increase in the vibrations to the traveling vehicle V. The four wheels 21 are arranged such that the wheels 21A, 21C in front and rear in the traveling direction T are aligned in or substantially in a straight line. Similarly, the wheels 21B, 21D in front and rear in the traveling direction T are aligned in or substantially in a straight line, and it is therefore possible to reduce the region on the track R through which the wheels 21 pass.

Figure 8:
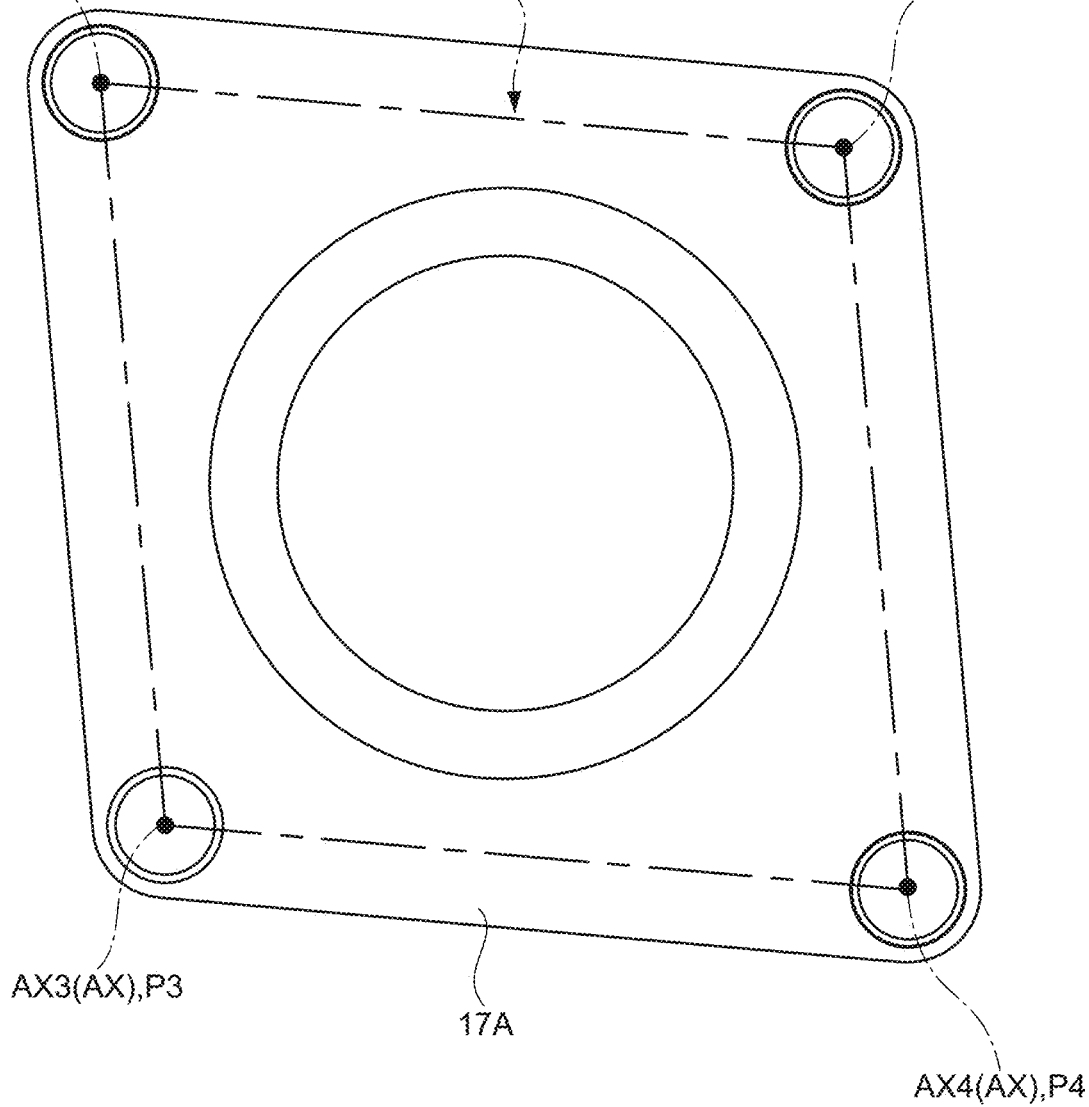
FIG. 8 is a diagram showing another example of an upper unit.

FIG. 8 shows another example of the upper unit 17. An upper unit 17A may be formed, in a plan view, in a rhombus shape having an opening in the center portion thereof, for example. In such a case, the upper unit 17A is of a configuration of having the quadrilateral QD located inside in a plan view and is thus unlikely to deform.

Figure 9:
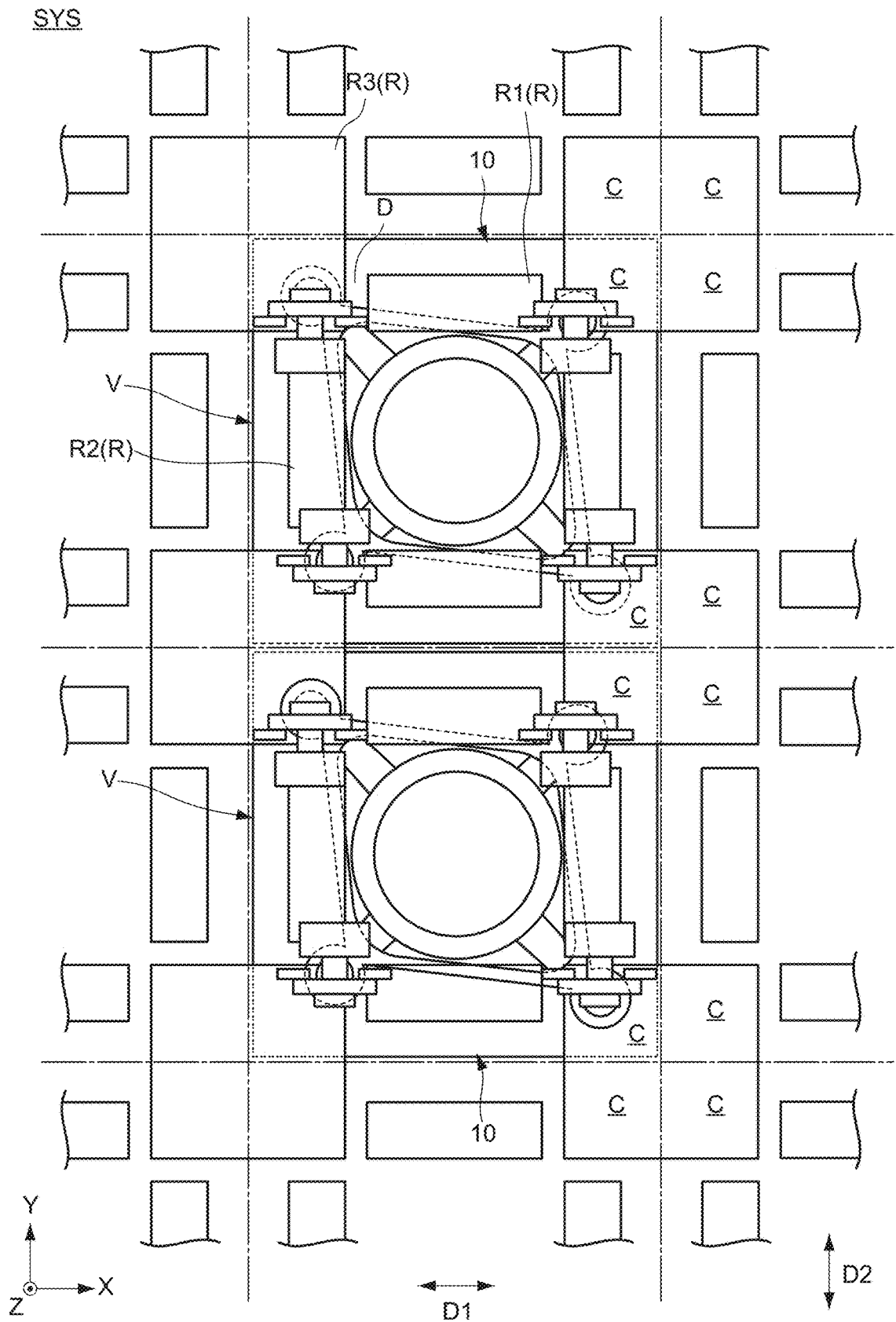
FIG. 9 is a diagram showing an example of two of the traveling vehicles being adjacent to each other in the traveling vehicle system.

FIG. 9 is a diagram showing an example of two of the traveling vehicles V being adjacent to each other in the traveling vehicle system SYS. The main body 10 is provided so as to fit, in a plan view, within one grid cell C, which is one cell in the grid-patterned track R. In such a configuration, in the case where a plurality of the traveling vehicles V are traveling on the grid-patterned track R, it is possible to prevent the traveling vehicles V from interfering with each other even when the traveling vehicles V are positioned in adjacent grid cells C.

As described above, in the traveling vehicle system SYS of the present preferred embodiment, the wheels 21 on the left and right in the traveling direction T are displaced from each other in the traveling direction T. Therefore, the left and right wheels 21 pass through the gaps D at different timings regardless of whether the traveling vehicle V is traveling on the first track R1 or the second track R2. As a result, it is possible to prevent the vibrations and noise generated when the wheels 21 pass through the gaps D from occurring simultaneously to the left and right wheels 21, and it is therefore possible to reduce or prevent the noise from being transmitted to a surrounding area while realizing smooth traveling by suppressing an increase in vibrations to the traveling vehicle V.

Hereunder, a second preferred embodiment is described. In the present preferred embodiment, the same configurations as those in the preferred embodiment described above are assigned with the same reference signs and the descriptions thereof are omitted or simplified where appropriate. Also, of the matters described in the preferred embodiments of the present specification, configurations applicable to the present preferred embodiment are also applied to the present preferred embodiment where appropriate.

Figure 10:
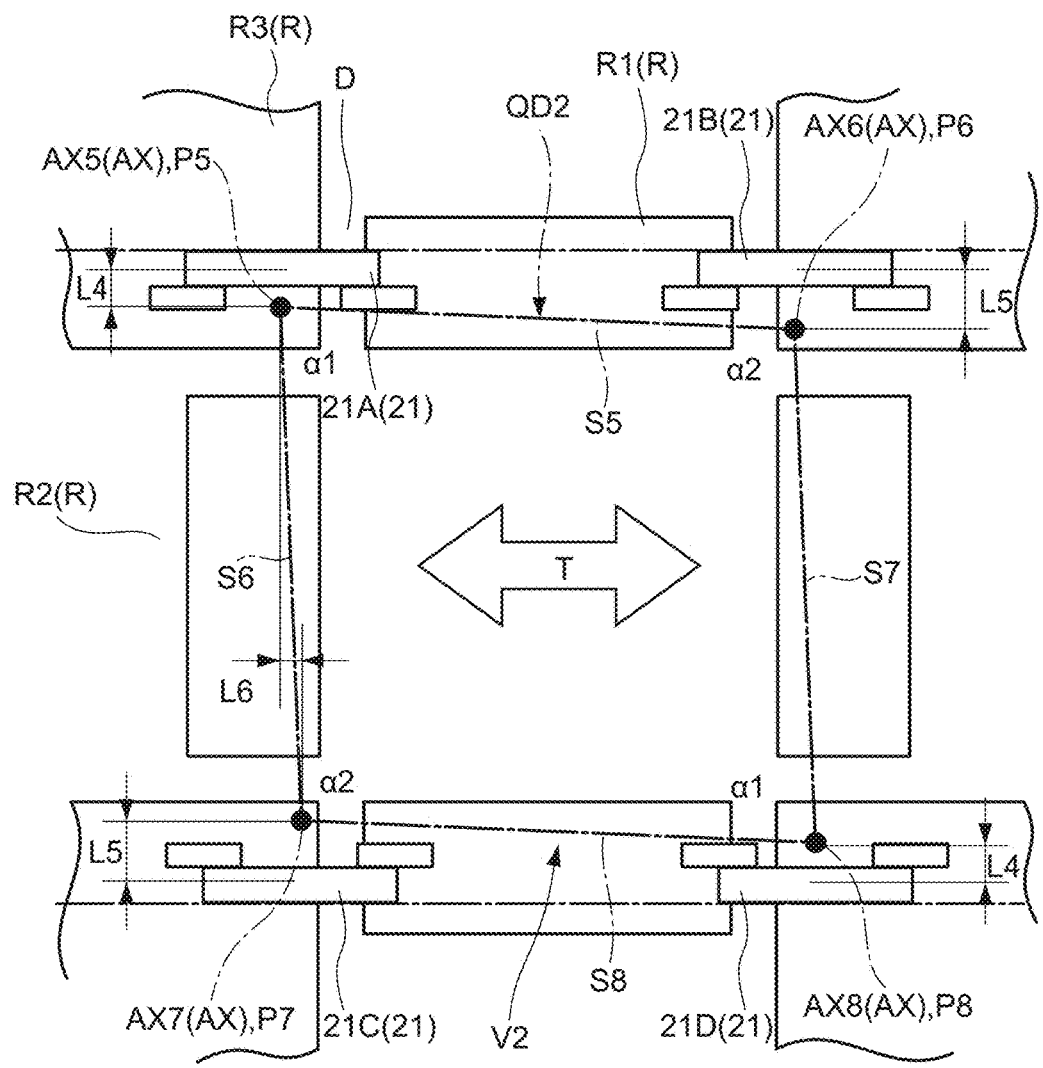
FIG. 10 is a diagram schematically showing an example of a traveling vehicle in a traveling vehicle system according to a second preferred embodiment of the present invention.
Figure 11:
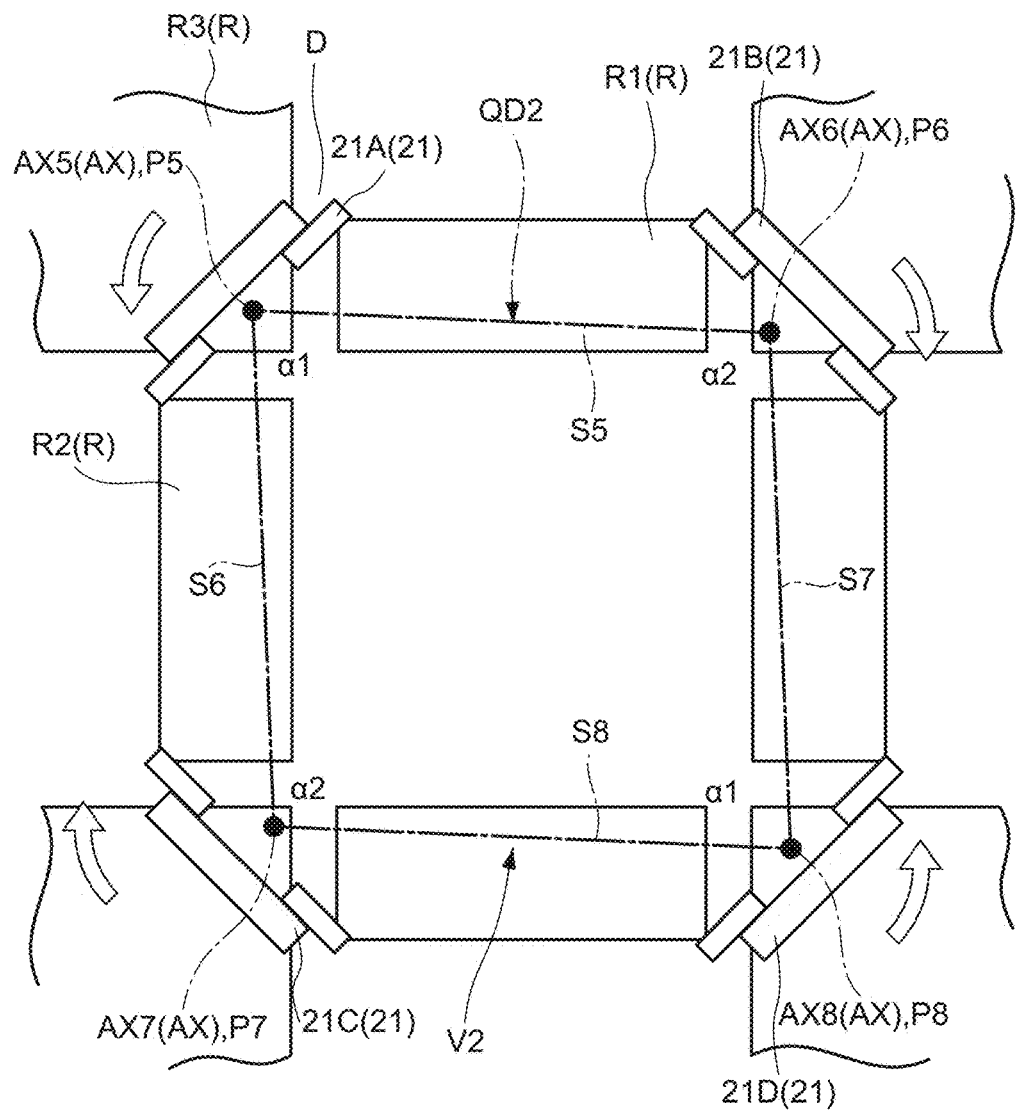
FIG. 11 is a diagram showing an example of an operation in which the traveling vehicle changes the traveling direction thereof from the first direction to the second direction.
Figure 12:
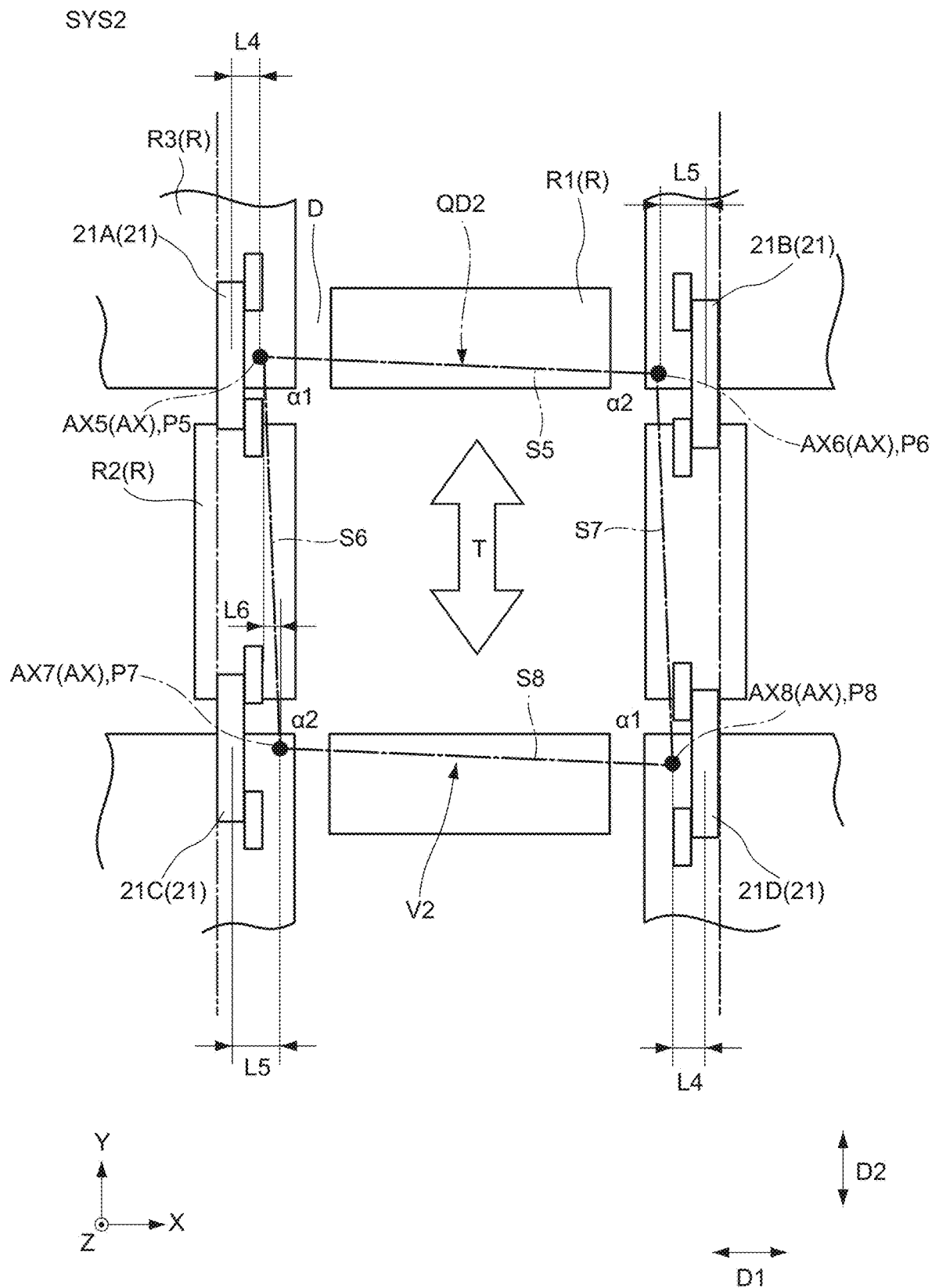
FIG. 12 is a diagram showing an example of the operation in which the traveling vehicle changes the traveling direction thereof from the first direction to the second direction.

FIG. 10 to FIG. 12 are plan views schematically showing an example of a traveling vehicle V2 in a traveling vehicle system SYS2 according to the second preferred embodiment, and illustrate an operation performed by the traveling vehicle V2 to change the traveling direction T from the first direction D1 to the second direction D2.

A quadrilateral QD2 in the present preferred embodiment is, for example, a rhombus in a plan view, and has four vertices P5 to P8 and four sides S5 to S8. The quadrilateral QD2 is of an arrangement such that none of the sides S5 to S8 are parallel to the first track R1 or the second track R2. In such a configuration, the four wheels 21 are arranged such that two of the wheels 21 on the left and right in the traveling direction T are displaced from each other by a distance L6 in the traveling direction T.

In the quadrilateral QD2, the two wheels 21A, 21D which correspond to two turning axes AX5, AX8 at the vertices P5, P8 on first opposing corners α1 of the rhombus are spaced away respectively from the turning axes AX5, AX8 corresponding thereto by a first distance L4. In the quadrilateral QD2, the two wheels 21B, 21C which correspond to two turning axes AX6, AX7 at the vertices P6, P7 on second opposing corners α2 of the rhombus are spaced away respectively from the turning axes AX6, AX7 corresponding thereto by a second distance L5.

When the traveling direction T is the first direction D1, the wheels 21A, 21B in front and rear in the traveling direction T are aligned in or substantially in a straight line, and the wheels 21C, 21D in front and rear in the traveling direction T are aligned in or substantially in a straight line. When the traveling direction T is the second direction D2, the quadrilateral QD2 is such that the wheels 21A, 21C in front and rear in the traveling direction T are aligned in or substantially in a straight line, and the wheels 21B, 21D in front and rear in the traveling direction T are aligned in or substantially in a straight line.

As described above, in the traveling vehicle system SYS2 according to the second preferred embodiment, the wheels 21 in front and rear in the traveling direction T are aligned in or substantially in a straight line regardless of whether the traveling vehicle V2 is traveling in the first direction D1 or the second direction D2. Therefore, it is possible to reduce the region on the track R through which the wheels 21 pass.

Hereunder, a third preferred embodiment is described. In the present preferred embodiment, the same configurations as those in the preferred embodiments described above are assigned with the same reference signs and the descriptions thereof are omitted or simplified where appropriate. Also, of the matters described in the preferred embodiments of the present specification, configurations applicable to the present preferred embodiment are also applied to the present preferred embodiment where appropriate.

Figure 13:
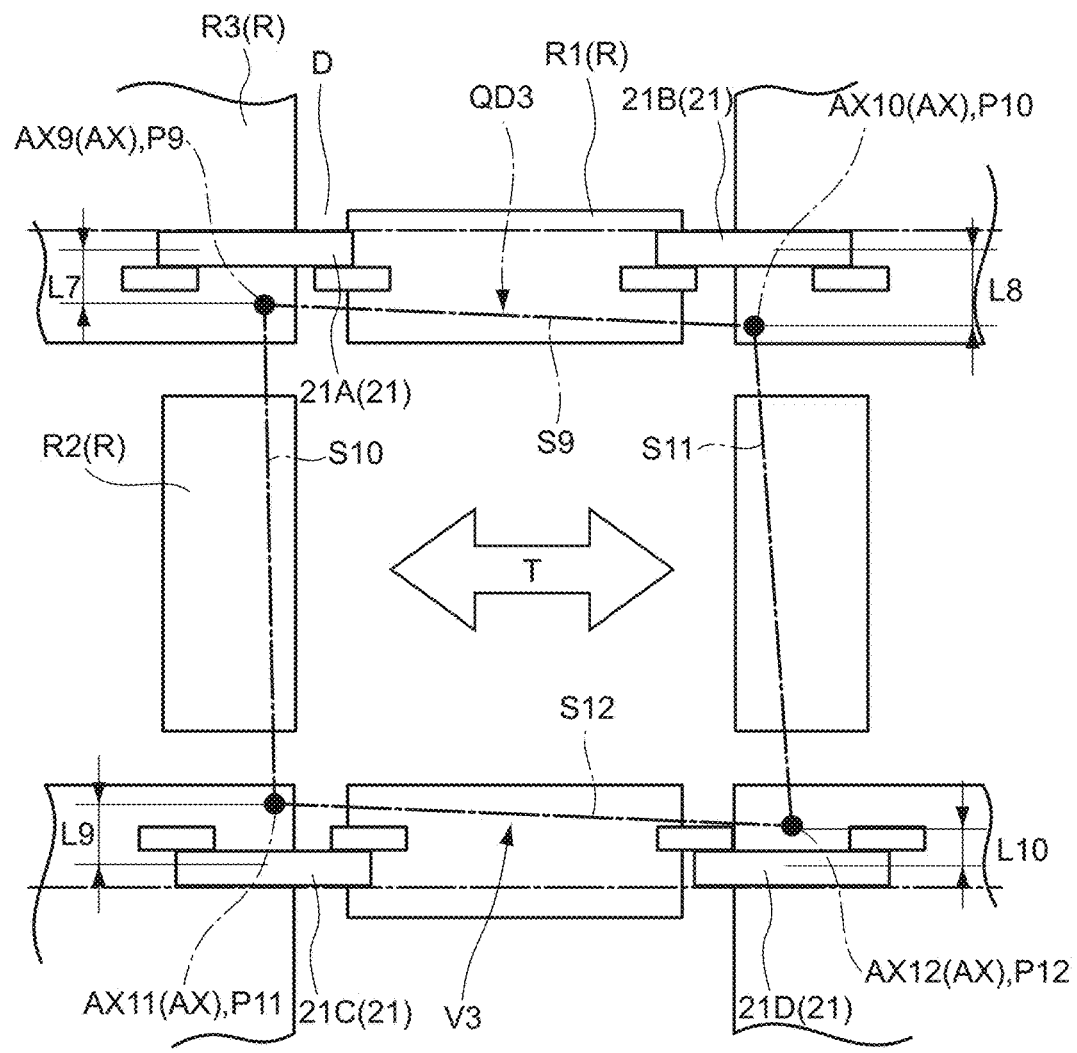
FIG. 13 is a diagram schematically showing an example of a traveling vehicle in a traveling vehicle system according to a third preferred embodiment of the present invention.
Figure 15:
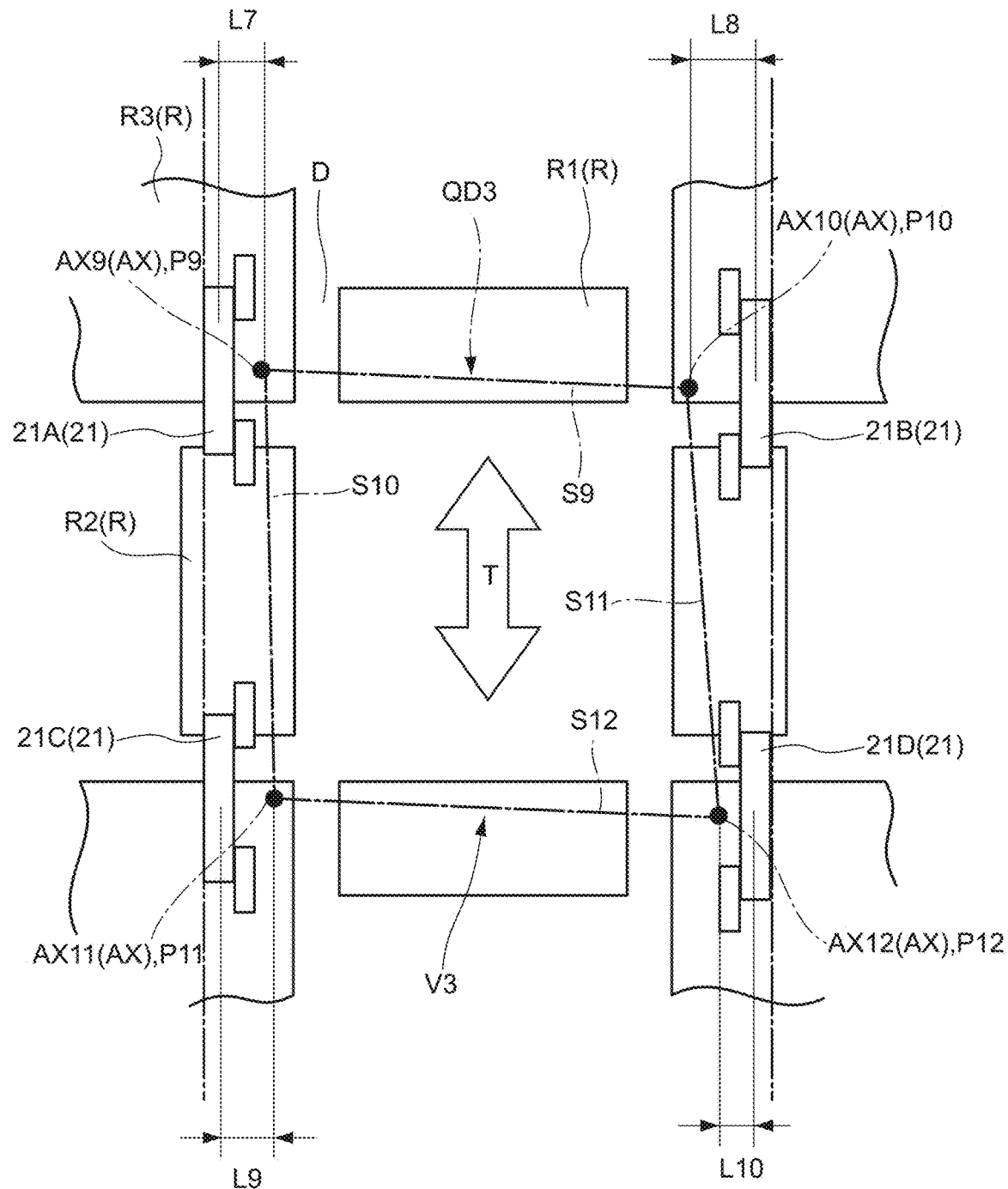
FIG. 15 is a diagram showing an example of the operation in which the traveling vehicle changes the traveling direction thereof from the first direction to the second direction.

FIG. 13 to FIG. 15 are plan views schematically showing an example of a traveling vehicle V3 in a traveling vehicle system SYS3 according to the third preferred embodiment, and illustrate an operation performed by the traveling vehicle V3 to change the traveling direction T from the first direction D1 to the second direction D2.

A quadrilateral QD3 in the present preferred embodiment has four vertices P9 to P12 and four sides S9 to S12. The quadrilateral QD3 is of an arrangement such that none of the sides S9 to S12 are parallel to the first track R1 or the second track R2. The quadrilateral QD3 of the present preferred embodiment is such that the opposing sides S9, S12 are parallel with each other, but the opposing sides S10, S11 are not parallel with each other, and the quadrilateral QD3 is thus not a rhombus. In the quadrilateral QD3, neither of these sets of opposing sides is parallel with each other. In such a configuration, the four wheels 21 are arranged such that two of the wheels 21 on the left and right in the traveling direction T are displaced from each other in the traveling direction T.

The wheel 21A corresponding to the turning axis AX9 at the vertex P9 is spaced away from the turning axis AX9 by a distance L7. The wheel 21B corresponding to the turning axis AX10 at the vertex P10 is spaced away from the turning axis AX10 by a distance L8. The wheel 21C corresponding to the turning axis AX11 at the vertex P11 is spaced away from the turning axis AX11 by a distance L9. The wheel 21D corresponding to the turning axis AX12 at the vertex P12 is spaced away from the turning axis AX12 by a distance L10.

When the traveling direction T is the first direction D1, the wheels 21A, 21B in front and rear in the traveling direction T are aligned in or substantially in a straight line, and the wheels 21C, 21D in front and rear in the traveling direction T are aligned in or substantially in a straight line. When the traveling direction T is the second direction D2, the wheels 21A, 21C in front and rear in the traveling direction T are aligned in or substantially in a straight line, and the wheels 21B, 21D in front and rear in the traveling direction T are aligned in or substantially in a straight line.

As described above, in the traveling vehicle system SYS3 according to the third preferred embodiment, the wheels 21 in front and rear in the traveling direction T are aligned in or substantially in a straight line regardless of whether the traveling vehicle V3 is traveling in the first direction D1 or the second direction D2. Therefore, it is possible to reduce the region on the track R through which the wheels 21 pass.

The present invention has been described through the above preferred embodiments. However, the technical scope of the invention is not limited to the description of the above preferred embodiments. It is apparent to those skilled in the art that various modifications or improvements can be added to the above preferred embodiments. Also, matters described with respect to a specific preferred embodiment can be applied to other preferred embodiments as long as they are not technically inconsistent. It is also apparent from the scope of claims that the present invention also encompasses one or more of such modifications or improvements. The contents of Japanese Patent Application No. 2020-189775 and all documents cited in the detailed description of the present invention are incorporated herein by reference to the extent permitted by law.

For example, in the traveling vehicles V, V2, and V3, a drive source to drive the wheel 21 may be provided for each of the four wheels 21, or a drive source may be provided for each of two or three of the four wheels 21. Also, for example, even if the wheels 21 on the left and right in the traveling direction T are driving wheels, the two wheels 21 on the left and right in the traveling direction T do not pass through the gaps D at the same time because these wheels 21 are arranged displaced from each other in the traveling direction T. Therefore, the traveling vehicles V, V2, and V3 can continue traveling with one of the drive wheels, thus realizing stable traveling performance.

In the traveling vehicle system, none of the sides of the quadrilateral defined by the four turning axes AX serving as the vertices thereof should be parallel with the first track R1 or the second track R2 in a plan view, and the two wheels 21 in front and rear need not be aligned on a substantially straight line. Even in such a traveling vehicle system, it is possible to obtain the same effects as those of the preferred embodiments described above.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A traveling vehicle system comprising:
a track; and
a traveling vehicle to travel on the track; wherein
the track includes a plurality of first tracks along a first direction, a plurality of second tracks along a second direction perpendicular or substantially perpendicular to the first direction, and a partial track at a portion where an extension line of the first track and an extension line of the second track intersect;
the traveling vehicle includes a traveler to travel on an upper side of the track, a main body below the track, and a coupler to couple the traveler and the main body;
a gap through which the coupler passes when the traveling vehicle travels is between the first track and the partial track, and between the second track and the partial track;
the traveler includes four wheels to travel on the track, and a direction changer to change a traveling direction of the traveling vehicle between the first direction and the second direction by turning the four wheels respectively around four turning axes which are perpendicular or substantially perpendicular to respective axles of the wheels; and in a plan view, none of sides of a quadrilateral with the four turning axes defining vertices thereof is parallel to the first track or the second track.

2. The traveling vehicle system according to claim 1, wherein the quadrilateral is a rhombus in a plan view.

3. The traveling vehicle system according to claim 2, wherein the four wheels are provided respectively at positions with equal or substantially equal lengths to the turning axes corresponding thereto;

the wheels which correspond to the turning axes corresponding to vertices of acute angles of the rhombus are provided on the traveling vehicle's inner side of the turning axes in a plan view; and the wheels which correspond to the turning axes corresponding to vertices of obtuse angles of the rhombus are provided on the traveling vehicle's outer side of the turning axes in a plan view.

4. The traveling vehicle system according to claim 2, wherein two of the wheels which correspond to two of the turning axes at vertices on first opposing corners of the rhombus are spaced away respectively from the turning axes corresponding thereto by a first distance;

two of the wheels which correspond to two of the turning axes at vertices on second opposing corners different from the first opposing corners of the rhombus are spaced away respectively from the turning axes corresponding thereto by a second distance different from the first distance; and the wheels in the front and rear in a traveling direction are in or substantially in a straight line.

5. The traveling vehicle system according to claim 1, wherein the track is includes a grid pattern defined by the first tracks and the second tracks; and in a plan view, the main body is provided so as to fit within one cell in the track including the grid pattern.

\* \* \* \* \*